United States Patent
Gonring et al.

(10) Patent No.: US 11,250,653 B2
(45) Date of Patent: Feb. 15, 2022

(54) CONFIGURABLE REMOTE CONTROL SYSTEM AND METHOD FOR A MARINE VESSEL

(71) Applicants: Brunswick Corporation, Mettawa, IL (US); FELL Marine Inc., Delray Beach, FL (US)

(72) Inventors: Steven J. Gonring, Slinger, WI (US); Walter B. Ross, Fond du Lac, WI (US); Fredrik Eriksen, Drammen (NO); Christian Frost Røine, Drammen (NO)

(73) Assignees: Brunswick Corporation, Mettawa, IL (US); FELL Marine Inc., Delray Beach, FL (US)

( * ) Notice: Subject to any disclaimer, the term of this patent is extended or adjusted under 35 U.S.C. 154(b) by 0 days.

(21) Appl. No.: 16/786,215

(22) Filed: Feb. 10, 2020

(65) Prior Publication Data
US 2020/0258331 A1    Aug. 13, 2020

Related U.S. Application Data

(60) Provisional application No. 62/804,978, filed on Feb. 13, 2019.

(51) Int. Cl.
*H04B 17/318*    (2015.01)
*B60R 25/04*    (2013.01)
(Continued)

(52) U.S. Cl.
CPC .......... *G07C 9/00309* (2013.01); *B60R 25/04* (2013.01); *B63H 21/21* (2013.01);
(Continued)

(58) Field of Classification Search
None
See application file for complete search history.

(56) References Cited

U.S. PATENT DOCUMENTS

| 4,250,358 A | 2/1981 | Gilbertson |
| 4,809,199 A | 2/1989 | Burgess et al. |

(Continued)

FOREIGN PATENT DOCUMENTS

WO    03045742 A1    6/2003

OTHER PUBLICATIONS

Extended European Search Report issued in corresponding EP Application No. 20157061.1 dated Jun. 29, 2020.
Mectronx, Smartphone Marine Ignition System, www.mectronx.com.

*Primary Examiner* — Muhammad Adnan
(74) *Attorney, Agent, or Firm* — Andrus Intellectual Property Law, LLP (57) ABSTRACT

A remote control system for a marine vessel includes a helm transceiver positioned on the marine vessel and configured to communicate with one or more fobs, and at least one operator fob configured to wirelessly transmit a fob signal to the helm transceiver on the marine vessel. A controller is configured to receive the fob signal transmitted by the operator fob and to determine an operator distance based on the fob signal. The operator distance is compared with one or more threshold distances, and then a system command is generated based on the comparison of the operator distance to the one or more threshold distances so as to control operation of one or more devices on the marine vessel.

17 Claims, 6 Drawing Sheets

(51) Int. Cl.
*B63H 21/21* (2006.01)
*H04W 4/02* (2018.01)
*G07C 9/00* (2020.01)
*B60R 21/00* (2006.01)

(52) U.S. Cl.
CPC ....... *G07C 9/00896* (2013.01); *H04B 17/318* (2015.01); *H04W 4/023* (2013.01); *B60R 2021/0095* (2013.01); *G07C 2009/00769* (2013.01); *G07C 2009/00984* (2013.01); *G07C 2209/64* (2013.01)

(56) References Cited

U.S. PATENT DOCUMENTS

| | | | |
|---|---|---|---|
| 6,404,071 B1* | 6/2002 | Kurano | B60R 25/04 114/55.58 |
| 6,450,845 B1* | 9/2002 | Snyder | B60N 2/002 280/735 |
| 6,799,546 B1 | 10/2004 | Gonring et al. | |
| 7,081,028 B1 | 7/2006 | Crane | |
| 7,268,695 B2* | 9/2007 | Konno | H02G 3/088 340/12.22 |
| 7,355,518 B1 | 4/2008 | Staerzl | |
| 7,656,278 B2* | 2/2010 | Onishi | B60R 25/24 340/426.12 |
| 7,751,282 B2* | 7/2010 | Holmes | G01S 5/0027 367/128 |
| 7,791,454 B2* | 9/2010 | Egawa | B60R 25/24 340/10.5 |
| 8,508,349 B2* | 8/2013 | Morgan | G08G 1/205 340/426.19 |
| 8,880,297 B2* | 11/2014 | Fujii | B60N 2/245 701/49 |
| 9,284,032 B1 | 3/2016 | Snyder et al. | |
| 9,695,764 B1 | 7/2017 | Christiansen et al. | |
| 10,317,517 B1* | 6/2019 | Dsilva | G01S 5/02 |
| 10,650,621 B1* | 5/2020 | King | H04L 67/10 |
| 10,793,245 B1* | 10/2020 | Trotter | B63H 21/21 |
| 2001/0050619 A1 | 12/2001 | Wiggerman et al. | |
| 2002/0052159 A1* | 5/2002 | Eguchi | B63C 9/0005 441/80 |
| 2003/0120831 A1 | 6/2003 | Dubil et al. | |
| 2005/0272372 A1 | 12/2005 | Rodriguez | |
| 2007/0159924 A1* | 7/2007 | Vook | G08B 13/1672 367/127 |
| 2008/0100417 A1* | 5/2008 | Hata | B60R 25/04 340/5.72 |
| 2008/0219100 A1* | 9/2008 | Fisher | G01S 5/30 367/124 |
| 2010/0049386 A1 | 2/2010 | Bamba | |
| 2011/0208359 A1 | 8/2011 | Duchene et al. | |
| 2012/0092129 A1* | 4/2012 | Lickfelt | B60R 25/24 340/5.72 |
| 2015/0070166 A1* | 3/2015 | Boyden | G08B 13/1672 340/540 |
| 2015/0194049 A1* | 7/2015 | Lickfelt | G08C 17/02 340/5.61 |
| 2016/0055699 A1 | 2/2016 | Vincent | |
| 2016/0320469 A1* | 11/2016 | Laifenfeld | G01S 5/14 |
| 2017/0236344 A1 | 8/2017 | Murar et al. | |
| 2017/0358159 A1* | 12/2017 | Hanson | G07C 9/00309 |
| 2018/0151009 A1* | 5/2018 | Kim | E05B 81/78 |
| 2018/0335780 A1* | 11/2018 | Stevens | G05D 1/0088 |
| 2019/0047512 A1 | 2/2019 | Gersabeck et al. | |
| 2019/0308614 A1 | 12/2019 | Lavoie et al. | |
| 2020/0020215 A1* | 1/2020 | Pirkle | H04L 69/28 |
| 2020/0031448 A1* | 1/2020 | Gonring | B63H 21/21 |
| 2020/0043315 A1* | 2/2020 | Watanabe | G08B 29/185 |
| 2020/0255104 A1* | 8/2020 | Gonring | B63H 21/21 |
| 2020/0257282 A1* | 8/2020 | Lavoie | B60W 60/00 |
| 2020/0349781 A1* | 11/2020 | Warrier | G01S 11/06 |
| 2021/0190970 A1* | 6/2021 | Edwards | H04W 4/80 |

* cited by examiner

CONFIGURABLE REMOTE CONTROL SYSTEM AND METHOD FOR A MARINE VESSEL

CROSS-REFERENCE TO RELATED APPLICATION

The present application claims priority to U.S. Provisional Application Ser. No. 62/804,978, filed Feb. 13, 2019, which application is hereby incorporated by reference in its entirety.

FIELD

The disclosure generally relates to remote control systems for marine vessels and, more particularly, to remote control systems that integrate with vessel control systems to automatically activate one or more devices or functions on the vessel.

BACKGROUND

The following U.S. Patents and Applications provide background information and are incorporated herein by reference in entirety.

U.S. Pat. No. 4,809,199 discloses a keyless marine access and engine control system. The system is caused to change from a dormant state to an enabled state when a sequence of actuation signals entered through a keypad matches data representing either one of two access sequences stored in the system's memory. When the system is in its enabled state, the system responds only to signals representing a keypad actuation exceeding a first predetermined time interval. These signals are used to crank, choke, and stop a marine vehicle engine. The secondary access sequence can be changed by a person who knows either the primary access sequence or the secondary access sequence, while the primary access sequence can be changed only by a person having knowledge of the present primary access sequence. In order to reprogram either access sequence, a programming button must be actuated for a predetermined time interval exceeding the first time interval. The system can be used with either a single or dual engine installation.

U.S. Pat. No. 6,799,546 discloses a method for starting a marine internal combustion engine that is independent of a continued signal received from a starting switch. If the operator of the marine vessel momentarily depresses a starting switch, a predetermined procedure is followed by a microprocessor which does not require continued involvement of the marine vessel operator. Various parameters are checked during the starting sequence and various actuators are activated to assure a safe and reliable starting procedure.

U.S. Pat. No. 7,081,028 discloses an engine control system for a marine propulsion system that uses a portable control device that is configured to emit first and second signals that are receivable by first and second sensors. The first signal relates to the starting of the engine of the marine propulsion system by the operator. The second signal relates to the presence of the operator, wearing the portable control device, within a prescribed zone surrounding the second sensor near the helm position.

U.S. Pat. No. 7,355,518 discloses a monitoring system that detects the presence or absence of a marine vessel operator within a defined zone near the helm of a marine vessel. The detection is accomplished through the use of a provision of an e-field and the detection of e-field strength by a receiving antenna system. When the operator is in the proper helm position, the e-field strength is diminished by the presence of a portion of the operator's body within the e-field zone.

U.S. Pat. No. 9,284,032 discloses a control system and method for deterring theft of a marine vessel. A security control circuit receives a transponder identification code from a transponder. The engine control circuit has a status that is based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a remote control system for a marine vessel includes a helm transceiver positioned on the marine vessel and configured to communicate with one or more fobs, and at least one operator fob configured to wirelessly transmit a fob signal to the helm transceiver on the marine vessel. A controller is configured to receive the fob signal transmitted by the operator fob and to determine an operator distance based on the fob signal. The operator distance is compared with one or more threshold distances, and then a system command is generated based on the comparison of the operator distance to the one or more threshold distances so as to control operation of one or more devices on the marine vessel.

One embodiment of a method of remotely controlling systems on a marine vessel includes transmitting a fob signal from an operator fob worn by an operator and receiving the fob signal transmitted by the operator fob at a helm transceiver. An operator distance is then determined based on the fob signal. The operator distance is compared to one or more threshold distances. Operation of one or more devices on the marine vessel is controlled based on the comparison between the operator distance and the one or more threshold distances.

Various other features, objects, and advantages of the invention will be made apparent from the following description taken together with the drawings.

DETAILED DESCRIPTION

Existing remote control systems utilizing fobs employ pre-set functionality and generally require users to actively provide instructions via the fob to instruct and remotely control actions for systems and devices on the marine vessel. For example, typical fobs for marine vessels have buttons for controlling predefined functions, such as lock and unlock buttons. The inventors have recognized that one of the challenges for developing remote control systems for accessing marine vessels is that the configuration of marine vessels is highly variable. Moreover, the inventors have recognized that marine vessels incorporate an increasing number of onboard systems, making marine vessels more complicated to operate and more prone to error. For example, systems may not be fully shut down as part of a shutdown procedure on the marine vessel—e.g., when an operator leaves a marine vessel, systems may be accidentally left on that drain the battery of the marine vessel or are otherwise problematic. Conversely, systems may be left off that should have been turned on, such as security systems or automatic bilge pump systems, thus leaving the unattended marine vessel vulnerable. Similarly, upon starting a marine vessel, systems may require particular startup procedures that may not be properly executed and may lead to confusion, long start times, and/or system malfunctions. Accordingly, the inventors have recognized that automatic start procedures that occur when a user approaches a marine vessel are desirable. Moreover, the inventors have recognized that the low volume of each marine vessel variant makes creating unique fobs for each variant impractical, and thus a configurable system is desired that can be tailored to each marine vessel and/or to each fob assigned to a user.

Upon recognition of the foregoing problems and challenges, and based on experimentation and research in the relevant field, the present inventor has developed the disclosed remote control system for marine vessels that allows customization of commands associated with a fob signal to better fit the need of each vessel and the desires of each individual. Furthermore, the inventor has developed a system that simplifies the startup and shutdown procedures for vessel systems where multiple shutdown and startup procedures can be automatically be executed as a user approaches or leaves a marine vessel.

In one embodiment, the remote control system detects a fob signal and determines an operator distance based on the fob signal. The remote control system then generates a system command based on the operator distance in order to control one or more devices on the marine vessel. To provide one example, the remote control system may be configured to start one or more vessel systems as an operator approaches a marine vessel and reaches the threshold distance, and may similarly be configured to turn off one or more vessel systems as the operator leaves a marine vessel. In one embodiment, the controllers configured to compare the operator distance with one or more threshold distances and to generate the system commands as the operator reaches each of the one or more threshold distances. The controller may also be configured to determine an operator direction with respect to the marine vessel based on the fob signal, and to generate the at least one system command based further on the operator direction. As described herein, the controllable devices controlled by the remote control system may include any of various vessel systems, such as battery switches, vessel lights, propulsion systems, seat position, radio presets, environmental control devices or systems, or the like. Accordingly, the remote control system may automatically execute startup and shutdown routines as an operator approaches or walks away from their marine vessel.

Additionally, in some embodiments, the remote control system may be configured to accommodate multiple different operators, each with a unique fob configured for each operator, wherein the system is customizably configured to carry out each individual's desired instructions associated with that fob. Accordingly, each user may configure the proximity-based functionality differently based on their individual preference and/or individual needs. In one embodiment, each fob permitted by the remote control system is associated with a set of system commands, wherein each system command in the set of system commands is associated with a command distance. Thus, the customized commands associated with each fob may be executed when that user carrying their fob approaches or leaves the marine vessel.

Figure 1A:
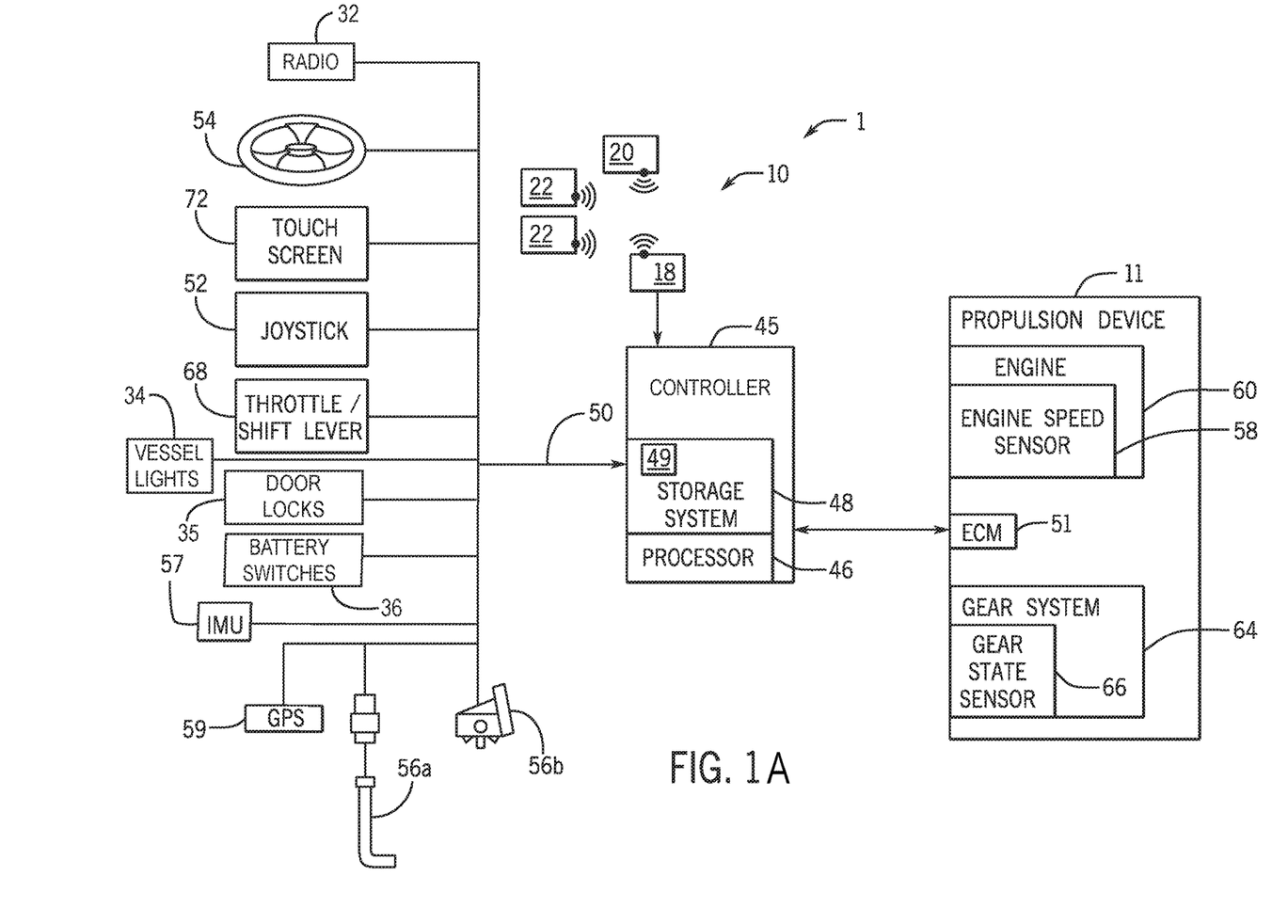
FIGS. 1A and 1B schematically depict embodiments of a vessel control system having a remote control system according to the present disclosure.
Figure 1B:
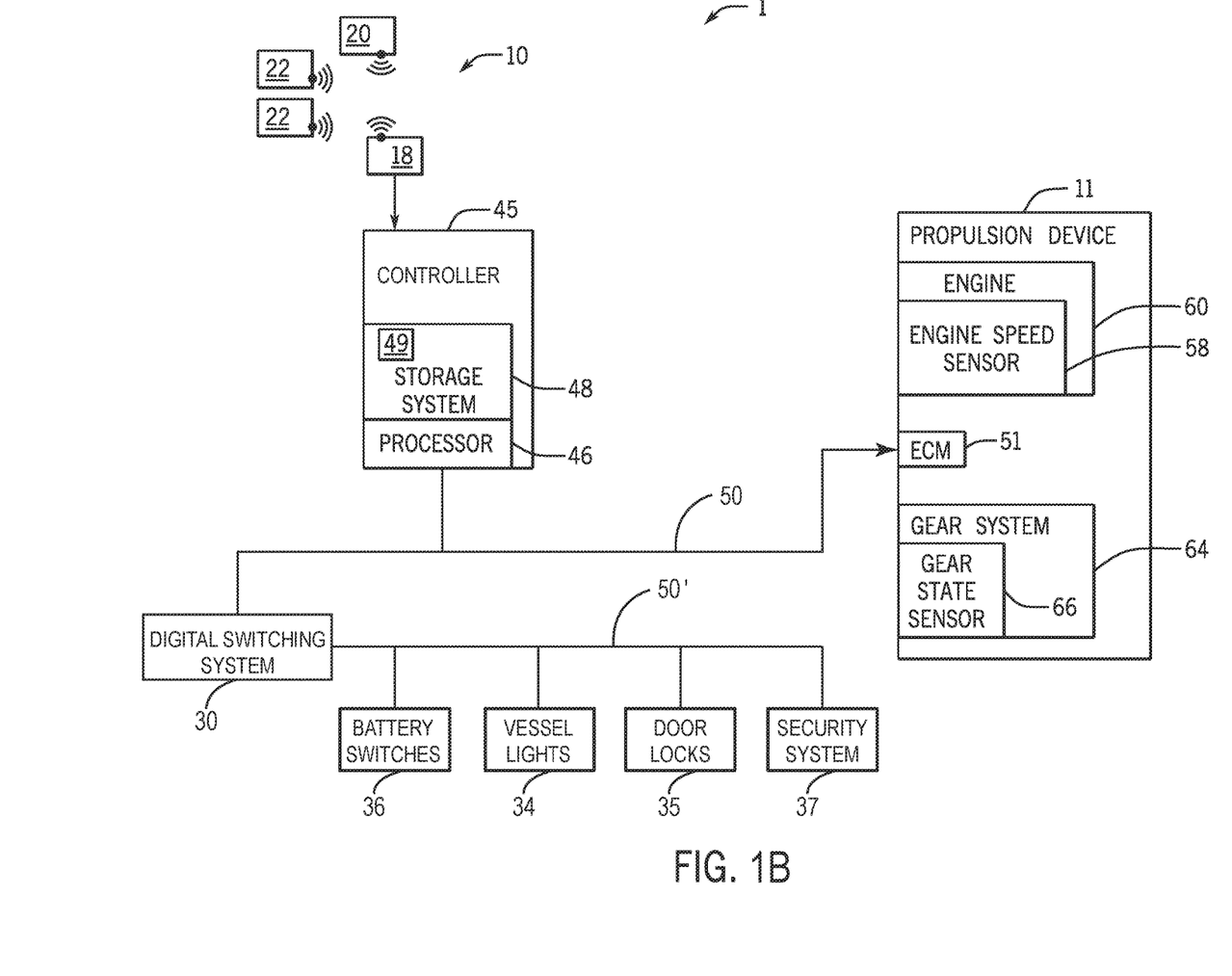

FIGS. 1A and 1B depict embodiments of a remote control system 10 operating within a vessel control system 1. The remote control system 10 includes one or more fobs 20, 22 that wirelessly communicate with a helm transceiver 18. The helm transceiver communicates with a controller 45, such as a command control module (CCM) or helm control module (HCM) or a dedicated control module for providing remote control functionality. The controller 45 is programmable and includes a processor 46 and a memory 48. In the depicted embodiment, the remote control system 10 is a radio communication system including a helm transceiver 18 in radio communication with one operator fob 20 carried by an operator of the marine vessel. The remote control system may also be in communication with one or more subordinate fobs 22 worn by other drivers, passengers or individuals on or around the marine vessel, where the subordinate fobs are also in communication with the helm transceiver 18. The remote control system 10 further includes a remote control module 49, which is a set of software instructions stored on and executable by controller 45 in order to detect permitted fobs and carry out remote control instructions accordingly. In one embodiment, remote control 49 includes instructions executable to determine an operator distance or operator direction based on fob signals received by one or more fobs, and to carry out system activation and deactivation functionality based on the operator distance and/or operator direction. Various embodiments of the remote control system 10 and system functionality are described herein.

In certain embodiments, the remote control system 10 may be configured for performing startup and shutdown procedures for vessel systems, or to otherwise enable or disable operation of one or more systems on the marine vessel. In certain embodiments, the remote control system 10 may only be active when a marine vessel is docked or moored, or otherwise appropriately situated for startup or shutdown. When the remote control system is active, the helm transceiver 18 continuously operates to detect and identify whether one or more fobs 20, 22 are present within a communication zone around the marine vessel. For example, the helm transceiver may be configured to continually emit a "polling" signal and await responses from one or more fobs 20, 22 configured to respond to such polling signals from the helm transceiver 18. In such an embodiment, the helm transceiver 18 is configured to emit a polling signal of sufficient strength such that any corresponding fobs 20, 22 within a predetermined zone of the marine vessel, a communication zone, will receive the polling signal and transmit a response signal identifying the respective fob. In one embodiment, each responding fob 20, 22 transmits a fob signal that includes a fob identification uniquely associated therewith such that the helm transceiver can identify the responding fob 20, 22. In certain embodiments, the fob identification also identifies a fob-type, such as a passenger fob or a driver fob.

The controller 45 is then configured to determine an operator distance based on the received fob signal and generate system commands to control operation of one or more devices within the marine vessel. For example, the controller may be configured to compare the operator distance with one or more threshold distances and to generate system commands when the operator reaches each of the one or more threshold distances. In certain embodiments, the controller 45 is further configured to determine the direction that the operator is traveling with respect to the marine vessel. For example, the operator direction may be determined based on the change in the operator distance over time. The controller 45 may then determine appropriate system commands based further on the operator direction, such as whether the operator is approaching the marine vessel 14, and thus heading toward the marine vessel, or is leaving the marine vessel 14 and thus is heading away.

In various embodiments and examples, the remotely controlled systems and devices may include starting and stopping one or more propulsion devices 11, locking or unlocking one or more door locks 35, turning on or off vessel lights 34 (which may include cabin lights, dock lights, underwater lights, etc.), turning on or off a radio 32 or other entertainment device, adjusting a seat position at the helm, activating an air handling or environmental control system to control a cabin temperature and/or humidity, activating or disabling a security system 37 or the like. Additionally, the controller 45 may be configured to control one or more battery switches 36 providing power to various devices and systems within the larger system 1, which may be controlled as an initial step when the operator is approaching or a final step when the operator is leaving.

The vessel control system 1 may include one or more control devices incorporated in the vessel network, such as a digital switching system 30 comprising multiple digital switching nodes to control various devices to enable and disable the vessel. For example, the digital switching system 30 may include networked digital switch interfaces, each configured to control one or more connected devices in a particular way in response to receipt of a command from the controller 45. For example, the digital switching system 30 may be a CZone Control and Monitoring system, by Power Products, LLC of Menomonee Falls, Wis. In one embodiment shown in FIG. 1B the digital switching system 30 receives instructions from the controller 45 via the vessel network 50, and then communicates instructions to various controlled devices or systems (e.g., vessel lights 34, door locks 35, battery switches 36, security system 37) via a second vessel network 50', such as a separate CAN bus.

In one embodiment, the helm transceiver 18 of the remote control system 10 may be placed within the helm area 15 of a marine vessel. The helm transceiver 18 receives radio signals from a wireless operator fob 20 and/or from one or more subordinate fobs 22. In many embodiments, the helm transceiver may also be configured to transmit radio signals to the fobs 20, 22. The helm transceiver 18 may be permanently mounted to the helm area 15 such as mounted in or behind the dashboard near the steering wheel 54 and/or throttle/shift lever 68. The helm transceiver 18 is connected to a power source, such as to 12 volt DC power provided by a battery associated with the propulsion device 11. The helm transceiver 18 further communicates with one or more controllers 45 to indicate whether radio signals are being received from the operator fob 20 and/or subordinate fob(s) 22. In certain embodiments, the helm transceiver 18 and fob(s) 20, 22 may communicate to determine an operator distance between the respective fob and the helm transceiver 18, and in such embodiments, the helm transceiver 18 may further communicate the operator distance to the respective controller 45 for use by the remote control module 49.

The wireless operator fob 20 and subordinate fob(s) 22 are each an electrical device carried or worn by the operator or others on the vessel which transmits radio signals to the helm transceiver 18. The wireless fobs are battery-driven, such as containing a replaceable or rechargeable battery. The helm transceiver 18 and wireless fobs 20, 22 may communicate by any of various wireless protocols. In certain embodiments, the helm transceiver 18 and wireless fobs 20, 22 may be RFID devices. In one embodiment, the wireless fobs 20, 22 may contain a passive or active RFID tag, and the helm transceiver 18 may be an active or passive reader. In certain embodiments, the transceiver 18 and fobs 20, 22 are active devices that communicate by any of various wireless standards, including Bluetooth standards or 802.11 WLAN.

Figure 2:
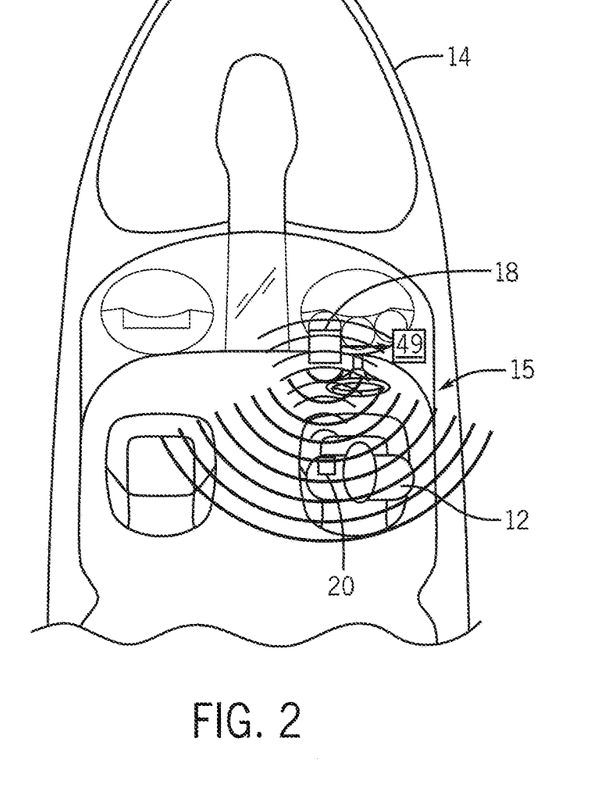
FIG. 2 exemplifies operation of an embodiment of a remote control system according to one embodiment of the present disclosure.

FIG. 2 depicts operation of one embodiment of the remote control system 10. For ease of illustration, the fob 20 and transceiver 18 are shown in close proximity to one another; however, it will be understood that the fob 20 and transceiver 18 communicate at larger distances, such as up to hundreds of feet or more. The helm transceiver 18 transmits a radio signal to the wireless operator fob 20 worn by the operator 12. The wireless operator fob 20 receives the radio transmission from the helm transceiver 18 and communicates a responsive signal thereto. In one exemplary embodiment, the helm transceiver 18 may continually "poll" the wireless operator fob 20, such as at a polling rate of once per second. In certain embodiments, the helm transceiver 18 may only generate the inquiry signal to poll the wireless operator fob 20 when certain conditions are met, such as when the vessel is docked, when the propulsion devices are off, and/or when the gear system 64 is in a neutral position. The wireless operator fob 20 receives the signal and returns a fob signal to the helm transceiver 18 indicating that the polling signal was received, and thereby the operator fob 20 (and accordingly the operator 12) is detected. Such information is then provided to the remote control module 49. In certain embodiments, the fob signal includes a fob identification, such as a unique code identifying the fob within the system 10.

Likewise, the subordinate fobs 22 may also be polled, which may be polled simultaneously with the operator fob using the same polling signal. In one embodiment, the transceiver 18 is configured to receive responses from multiple fobs and to identify and/or select an operator fob 20, which will be the controlling fob for activating and deactivating the devices on the marine vessel. In certain embodiments, one or more different fob-types may be present, and only certain fobs may communicate as potential operator fobs. Where multiple fobs respond to a polling signal, for example, the controller 45 may be configured to identify one of the fobs as the operator fob 20 and the remaining fobs as subordinate fobs 22. The operator and subordinate fob assignments may be based, for example, on a priority list of fob identifications where each fob configured within the system (which may all be operator-fob types approved for performance as an operator fob, referred to herein as the "permitted fobs") is ranked in an order of priority as to which fob should be selected the dominant position of operator fob 20. In other embodiments, the controller 45 may be configured to select the first fob detected as the operator fob 20, and all later detected fobs as subordinate fobs. In still other embodiments, different methods may be utilized for selecting the operator and subordinate fob roles. For example, as described in more detail with respect to FIG. 5, a subordinate fob may become an operator fob if the prior-assigned operator fob gets more than a threshold distance away from the helm transceiver, or otherwise leaves a predefined area within the communication zone, while one or more subordinate fobs 22 remain on or close to the marine vessel 14.

In certain embodiments, the helm transceiver 18 and wireless operator fob 20 may be configured to determine a distance therebetween, which is referred to herein as the operator distance. The remote control system 10 may likewise determine a distance between the one or more subordinate fobs 22 and the helm transceiver 18. In one embodiment, the wireless operator fob 20 determines the distance to the helm transceiver 18 based on the helm transceiver signal. In one such embodiment, the helm transceiver 18 determines the operator distance based on the time it receives the responsive signal from the operator fob 20 compared to the time it transmitted its inquiry signal to the operator fob 20. In other embodiments, the operator fob 20 may be configured to determine the operator distance—which may be a 'time-of-flight" determination or may be determined based on a measured signal strength of the received inquiry signal—and transmit that operator distance value to the helm transceiver 18. In still other examples, the operator distance may be determined based on the radio signal strength indicator (RSSI) of the fob signal received at the helm transceiver 18. The RSSI may be used to estimate the distance between the operator and the helm transceiver, or the operator and the vessel.

Likewise, the helm transceiver and/or the controller 45 may be configured to determine an operator direction based on the fob signal received over time. Namely, as the operator carrying the operator fob 20 moves closer to the helm transceiver 18, the signal strength, or RSSI, increases. Likewise, as the operator carrying the fob 20 moves further away from the helm transceiver 18, the RSSI decreases. Thus, an operator direction differentiating between the operator moving toward the marine vessel and the operator moving away from the marine vessel is determined based on the change in RSSI over time. In one embodiment, the system 10 may be configured to determine the operator direction based on a filtered or average RSSI over time, or based on a filtered or average change in RSSI over time. Thereby, errors due to noise or temporary disruptions or interference with the fob signal can be reduced. To provide one example, the operator direction may be based on a rolling average of the change in RSSI.

The remote control system 10 may be configured such that each fob 20, 22 is associated with a set of system commands that control operation of devices on the marine vessel accordingly when that fob is active, such as selected as the operator fob 20. Each set of system commands may be configurable by the user. In certain embodiments, each system command in the set of system commands may be associated with a threshold distance or one of a predefined set of threshold distances, which is the distance at which the system command is actuated. Alternatively or additionally, each system command may be associated with an operator direction, where certain system commands are generated when the operator is moving towards the marine vessel, and others are generated when the operator is moving away from the marine vessel.

Figure 3:
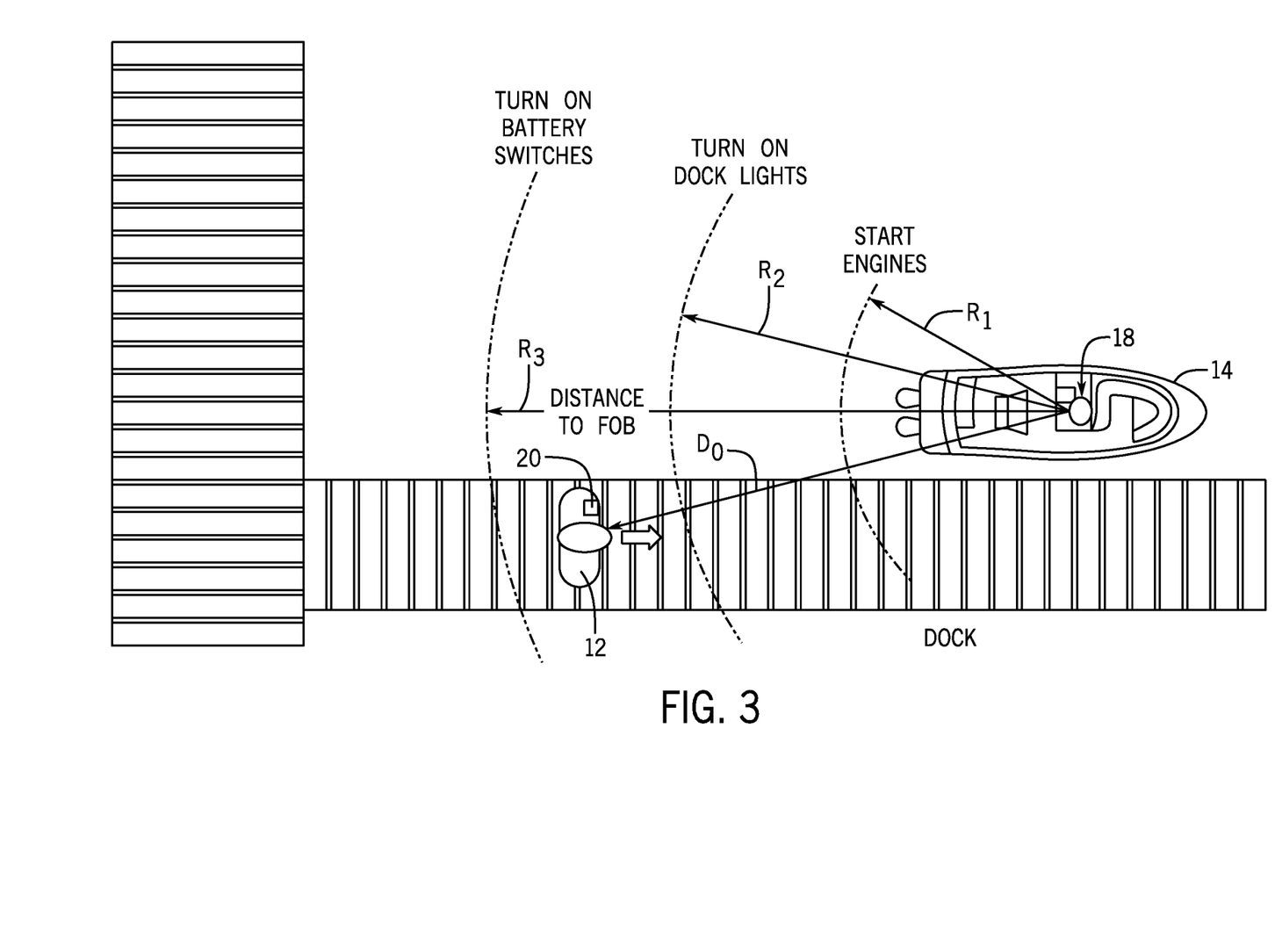
FIG. 3 is a schematic diagram exemplifying operation of one embodiment of a remote control system and method according to the present disclosure.

FIG. 3 illustrates one example, where an operator 12 carrying an operator fob 20 is moving toward the marine vessel 14. Thus, the operator distance $D_O$ between the operator fob 20 and the helm transceiver 18 is decreasing over time. As the operator distance $D_O$ crosses one or more threshold distances $R_1$, $R_2$, $R_3$, various system commands are generated. In the example, when the operator 12 crosses the threshold radius $R_3$, a system command to turn on battery switches is generated. As the operator 12 keeps moving towards the marine vessel 14, the distance $D_O$ is continually monitored. When $D_O$ reaches the next threshold distance $R_2$, a system command to turn on dock lights is generated. Then, when the operator distance $D_O$ reaches the next threshold $R_1$, the engines 60 of the one or more propulsion devices 11 are started. As will be understood by a person having ordinary skill in the art, the example of FIG. 3 merely illustrates exemplary system commands that may be effectuated at various threshold distances, and such examples are not limiting. Any of the various system commands may be generated at any number of thresholds. Likewise, various fobs may be associated with various system commands.

In the example shown, the remote control system 10 is incorporated and in communication with the controller 45. The controller 45 stores and executes the remote control module 49, including executing logic to determine which fobs 20, 22 are detected and their distances and/or directions, and to generate system commands accordingly to activate or deactivate devices on the vessel system 1. The controller 45 is programmable and includes a processor 46 and a memory 48. In the depicted embodiment, the remote control module 49 is stored on the storage system 48 and executable on the processor 46 of the controller 45. Accordingly, the helm transceiver 18 communicates with the controller 45 to effectuate the remote control system 10. For example, the controller 45 may communicate with one or more control modules for the respective propulsion devices 11 incorporated within the system 1. In the depicted embodiment, the controller 45 communicates with an engine control module (ECM) 51 for each propulsion device 11. Thereby, the controller 45 can instruct each ECM 51 in order to effectuate certain control actions, for example, starting or shutting down the engine 60.

Only one propulsion device 11 is shown in FIGS. 1A and 1B; however, it will be known to a person having ordinary skill in the art that any number of one or more propulsion devices may be incorporated within the system 1. In various embodiments, the propulsion devices 11 may be an outboard motor, an inboard motor, a sterndrive, or any other propulsion device available for propelling a marine vessel 14. Similarly, the propulsion device 11 may incorporate an internal combustion engine or may be an electric-powered propulsion device, such as an electric motor.

The controller can be located anywhere on the marine vessel 14, and/or located remotely from the marine vessel 14. The controller 45 communicates with various components of the system 1 via the vessel network 50 comprising wired or wireless links, as will be explained further hereinbelow. A person having ordinary skill in the art viewing this disclosure will understand that the remote control module 49, and the methods disclosed and discussed herein, can be carried out by various control elements within the system 1, and may be carried out by a single control module or by several separate control modules that are communicatively connected.

The controller 45 may be a computing system that includes a processing system, storage system, software, and input/output (I/O) interfaces for communicating with devices such as those shown in FIGS. 1A and 1B. The processing system loads and executes software from the storage system 48, such as software programmed with the remote control module 49. When executed by controller 45, the remote control module 49 directs the processing system 46 to operate as described below in further detail to execute the remote control method. The computing system may include one or more application modules and one or more processors, which may be communicatively connected. The processing system can comprise a microprocessor (e.g., processor 46) and other circuitry that retrieves and executes software from the storage system. The processing system can be implemented within a single processing device but can also be distributed across multiple processing devices or sub-systems that cooperate in existing program instructions. Non-limiting examples of the processing system include general-purpose central processing units, applications specific processors, and logic devices. The storage system 48 can comprise any storage media readable by the processing system and capable of storing software.

In this example, the controller 45 communicates with one or more components of the system 1 via a vessel network 50, which can be a wired or wireless link. The controller 45 is capable of monitoring and controlling one or more operational characteristics of the system 1 and its various sub-systems by sending and receiving control signals via the vessel network 50. In one example, the vessel network 50 is a controller area network (CAN) bus, such as a CAN Kingdom network, but other types of communication links could be used. It should be noted that the extent of connections of the vessel network 50 shown herein is for schematic purposes only, and the vessel network 50 may provide communication between the controller 45 and each of the sensors, devices, etc., or control devices therefor, although not every connection is shown in the drawing for purposes of clarity.

As mentioned, the central control module may receive, either directly or indirectly, inputs from several different sensors and/or input devices aboard or coupled to the marine vessel 14. For example, the controller 45 may receive a steering input from a joystick 52 and/or a steering wheel 54. The controller 45 may receive an input from one or more vessel speed sensors 56. The vessel speed sensor 56 may be, for example, a pitot tube sensor 56*a*, a paddlewheel type sensor 56*b*, or any other speed sensor appropriate for sensing the actual speed of the marine vessel. Alternatively or additionally, the vessel speed may be obtained by taking readings from a GPS device 59, which calculates speed by determining how far the marine vessel 14 has traveled in a given amount of time. Similarly, the controller 45 may receive input from a position determination device, such as GPS 59, continuously tracking and providing global position information describing the current location of the marine vessel. The propulsion device 11 is provided with an engine speed sensor 58, such as but not limited to a tachometer, which determines a speed of the engine 60 in rotations per minute (RPM). The engine speed can be used along with other measured or known values to approximate a vessel speed (i.e., to calculate a pseudo vessel speed). The system 1 may further include and vessel attitude sensor 57 sensing the orientation of the vessel with respect to an inertial frame of reference. For example, the vessel attitude sensor 57 may be an internal measurement unit (IMU) comprising a gyroscope, such as a three-axis gyroscope, to detect vessel orientation information. Alternatively or additionally, the attitude sensor 57 may include a magnetometer or may include any other type of position or inertial measurement unit, such as a combination accelerometer and/or gyroscope with a magnetometer.

A gear system 64 and gear state sensor 66 can also be provided for the propulsion device 11. For example, the gear state sensor 66 may provide an output indicating whether the gear system 64 (which may take any of various forms known in the art, such as a dog clutch) is in a forward gear state, a neutral state, or a reverse gear state. In certain embodiments, the outputs of the gear state sensor 66 and/or the engine speed sensor 58 may be provided directly to the controller 45. In other embodiments, the gear state and engine speed information may be provided to an intermediary control device, such as an engine control module, which may then make such information available to the controller 45.

Other inputs to the system 1 can come from operator input devices such as a throttle/shift lever 68, a steering wheel 54, a keypad (not shown), and a touchscreen 72. The throttle/shift lever 68 allows the operator of the marine vessel to choose to operate the vessel in neutral, forward, or reverse, as is known, and the gear system 64 is positioned accordingly. The keypad can be used to initiate or exit any number of control or operation modes (such as to activate and deactivate the remote control system 10) or to make selections while operating within one of the selected modes.

In certain in embodiments, the control system 1 includes one or more control devices positioned on the vessel network 50 and configured to receive instructions from the controller 45 and carry out the instructions accordingly (e.g., to control the battery switches 36, door locks 35, vessel lights 34, radio 32, or propulsion device 11 accordingly). With reference to FIGS. 1A and 1B, the controller 45 may communicate with the ECM 51 in order to start or shut down the one or more engines 60. Similarly, the control system 1 may include a digital switching system 30, as is describe above.

Figure 4:
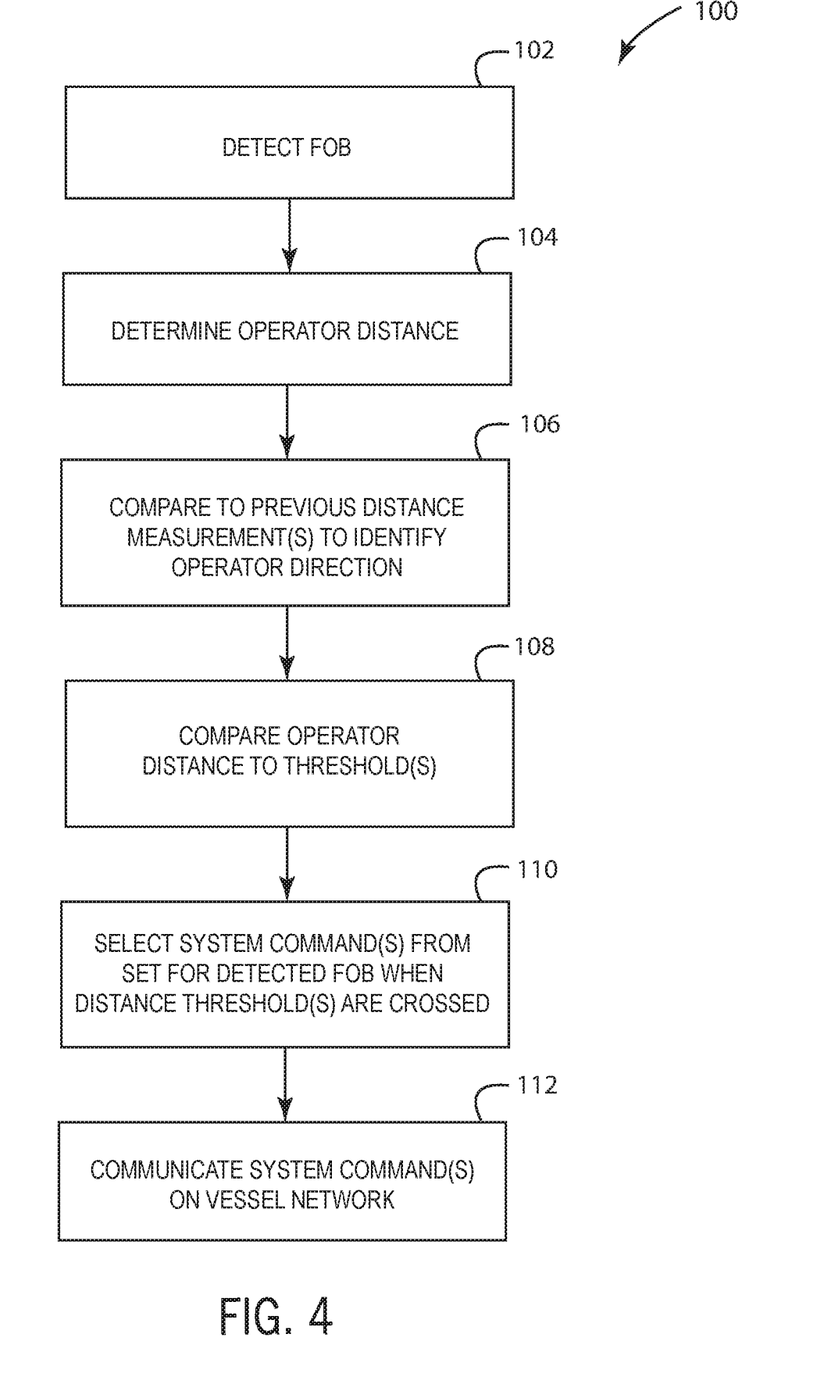
FIGS. 4 and 5 depict embodiments of a method for remote control of one or more devices on a marine vessel.
Figure 5:
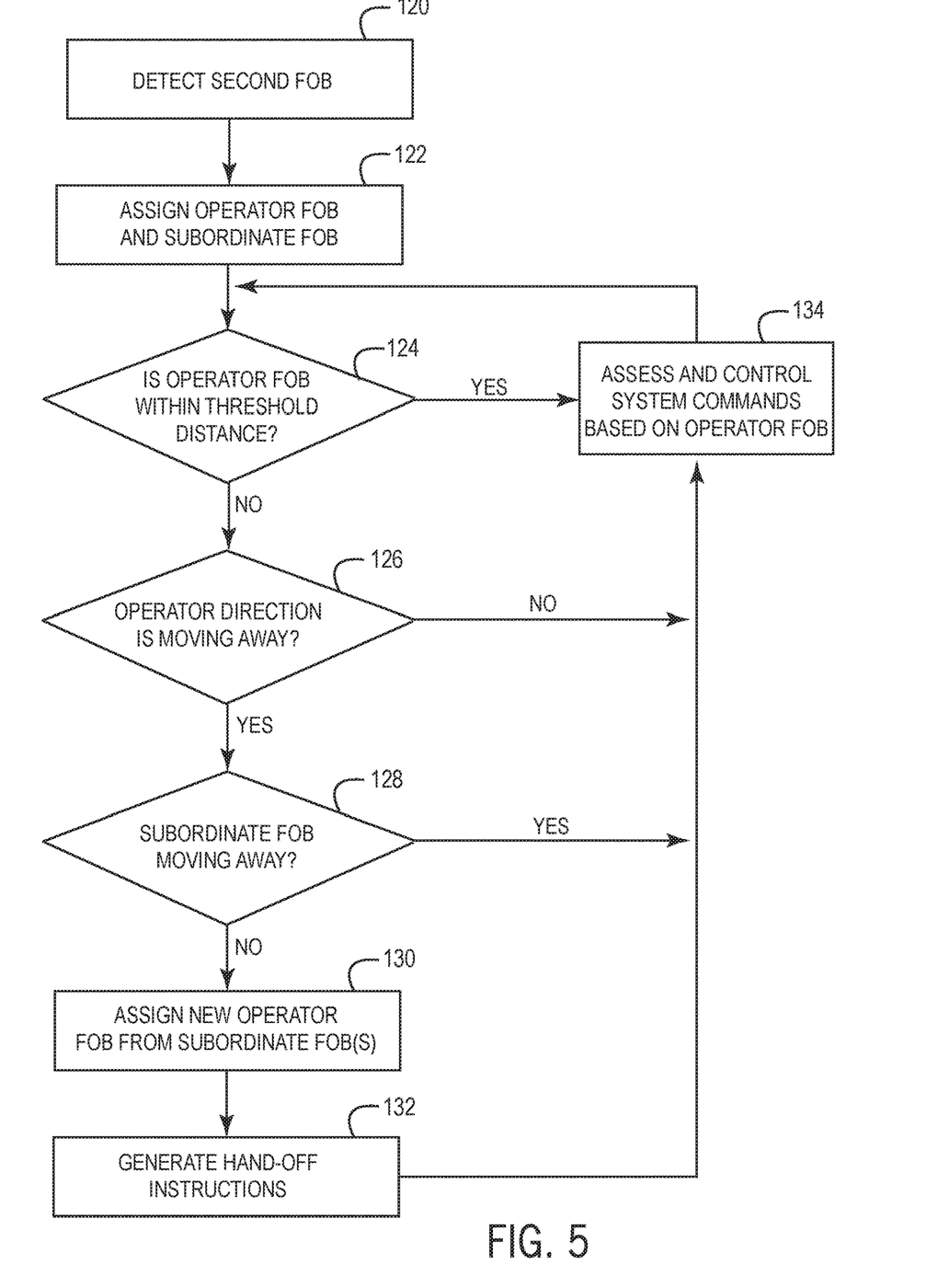

FIGS. 4 and 5 depict exemplary embodiments of methods and functionality performed by the remote control system. The remote control method 100 depicted in FIG. 4 depicts exemplary steps for fob detection and system command generation accordingly. The steps at FIG. 4 may be repeated every time a fob signal is received, such as in response to polling by the helm transceiver 18. Thereby, appropriate system commands will be updated based on the operator distance and operator direction. A fob is detected at step 102, such as by receiving a fob signal from the operator fob 20 containing the fob ID associated therewith. An operator distance is determined at step 104, such as based on the RSSI or by other methods as described above.

The operator distance is compared to previously determined distances at step 106 to identify the operator direction. For example, the operator distance may be compared to an averaged or filtered value of previous distance measurements, or a change in operator distance may be determined and compared to previous changes in distance measurements or a filtered value of previous changes. Similarly, the operator distance determined at step 104 may be a filtered value, such as an average of three or more distance estimations. Thereby, the system can better avoid reacting to erroneous measurements resulting from interference or temporary obstruction of the fob signal, etc. The operator distance is compared to thresholds at step 108, where the thresholds are distances at which system commands are to be effectuated. When a distance threshold is crossed, step 110 is executed to select a system command from the set of system commands associated with the detected fob. The selected system command may also be based on the operator direction, as described above. The selected system command is then communicated on the vessel network at step 112 so as to effectuate control of the one or more devices on the network (e.g., battery switches 36, vessel lights 34, or engines 60 as shown in FIG. 3).

FIG. 5 depicts another embodiment of method steps that may be executed by the remote control system 10 when two or more fobs are detected. When a second fob is detected at step 120, instructions are executed at step 122 to select one of the two detected fobs as an operator fob and the other as a subordinate fob. For example, the fob selected as the operator fob 20 may be the first fob detected by the transceiver 18. Alternatively, the operator fob role may be selected based on a priority list of permitted fobs, such as stored in the controller 45 and accessible by the remote control module 49. For example, the priority list of permitted fobs may rank all permitted fobs configured in the system 10 in a prioritized list, and the detected fob with the highest priority rank in the list may be selected as the operator fob. A person having ordinary skill in the art will understand in view of this disclosure that additional methods or logic may be executed in order to select and manage the operator and subordinate fob roles.

The remote control module 49 may be configured to manage the two fobs such that if the fob assigned as the operator fob leaves the vessel and/or is no longer communicating with the helm transceiver 18, then one of the remaining fobs may be selected as the operator fob for remote control purposes. Additionally, the system may be configured such that the shutdown procedures associated with the initial operator fob may not be executed if one or more subordinate fobs remain on the marine vessel. In certain scenarios and embodiments, it may be undesirable to shut down the marine vessel—e.g., automatically turn off propulsion devices, lock doors, and/or turn off lights—when an assigned operator leaves a marine vessel if other people remain on the marine vessel. Accordingly, the remote control may execute steps, one embodiment of which is exemplified at FIG. 5, to handoff the operator fob role to a subordinate fob under certain conditions.

In the example, instructions are executed at step 124 to determine whether an operator fob is within a threshold distance. For example, the threshold distance may be associated with the size of the marine vessel, such as to determine whether the operator fob remains on the marine vessel. In another example, the threshold distance may be one of the thresholds associated with one or more system commands. In still another example, the threshold distance may be slightly less than the threshold distance for certain system commands, such as a system command to turn off engines or turn off vessel lights.

If the operator fob remains within the threshold distance at step 124, then the system commands continue to be controlled based on the operator fob, represented at step 134. Once the operator fob crosses the threshold distance at step 124, instructions may be executed to determine whether the operator direction is moving away at step 126. If not, then the remote control system 10 may be configured to assume that the operator is not leaving the marine vessel and to continue to effectuate system commands based on the current operator fob. However, if the operator fob is moving away, then the one or more subordinate fobs may also be assessed at step 128 to determine if they are also moving away—e.g., everyone is leaving the marine vessel. If a subordinate fob remains on the marine vessel and is not moving away at step 128 then a new operator fob may be selected at step 130 from those one or more subordinate fobs 22 that remain on the marine vessel (e.g., are within the threshold distance) and are not moving away. Handoff instructions may be generated at step 132 to handoff the operator fob roll to the newly selected fob. For example, certain system commands may be generated or intentionally ignored to reconcile differences between the set of commands associated with the newly-selected operator fob and those associated with the previously-assigned operator fob.

In certain embodiments, the controller 45 may be configured to respond to certain system commands from a subordinate fob 22 in addition to those from the operator fob 20. For example, the controller may be configured to select and communicate a subordinate system command from the set of system commands associated with a subordinate fob 22 when that subordinate command does not conflict with the set of system commands for the operator fob 20.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A remote control system for a marine vessel, the remote control system comprising:
 a helm transceiver positioned on the marine vessel and configured to communicate with one or more fobs;
 at least one operator fob configured to wirelessly transmit a fob signal to the helm transceiver on the marine vessel, wherein the fob signal communicates a fob identification associated with the operator fob to the helm transceiver;
 a controller configured to:
 store a plurality of sets of system commands, including a set of system commands for each of a plurality of fob identifications in a list of permitted fob identifications, wherein each system command in each set of system commands is associated with a threshold distance and an operator direction;
 receive the fob signal transmitted by the operator fob;
 retrieve the set of system commands associated with the fob identification;
 determine an operator distance based on the fob signal;
 compare the operator distance with one or more threshold distances;
 determine an operator direction with respect to the marine vessel based on the fob signal from the operator fob; and
 generate a system command based on the comparison, the operator direction, and the set of system commands for the fob identification so as to control operation of one or more devices on the marine vessel.

2. The system of claim 1, wherein the controller is configured to determine the operator direction as either toward the marine vessel or away from the marine vessel.

3. The system of claim 1, wherein the controller determines the operator distance based on a radio signal strength indicator of the fob signal, and where the controller determines the operator direction based on a change in operator distance over time.

4. The system of claim 1, wherein the controller is further configured to, when fob signals are received from at least two fobs, select one of the at least two fobs as the operator fob and access the set of system commands associated with the fob identification for the fob selected as the operator fob.

5. The system of claim 4, wherein the operator fob is selected based on a prioritized list of the permitted fob identifications.

6. The system of claim 4, wherein the operator fob is selected based on an order of detection of the at least two fobs.

7. The system of claim 1, wherein the controller is further configured to verify that the fob identification is on the list of permitted fob identifications prior to selecting at least one system command from the set of system commands associated with the fob identification of the detected fob.

8. The system of claim 1, wherein the controller is further configured to select a fob as the operator fob and generate the system command based on the set of system commands associated with the operator fob, wherein the operator fob is selected based on a prioritized list of permitted fobs.

9. The system of claim 1, wherein each system command in the set of system commands for each fob identification is associated with one of a plurality of threshold distances such that a different command is generated to control operation of the one or more devices on the marine vessel as the operator distance crosses each of the plurality of threshold distances from the marine vessel.

10. A method of remotely controlling systems on a marine vessel, the method comprising:
storing a plurality of sets of system commands, including a set of system commands for each of a plurality of fob identifications in a list of permitted fob identifications, wherein each system command in the set of system commands is associated with a threshold distance and an operator direction;
transmitting a fob signal from an operator fob worn by an operator;
receiving the fob signal transmitted by the operator fob at a helm transceiver, wherein the fob signal communicates a fob identification associated with the operator fob to the helm transceiver;
determining an operator distance based on the fob signal;
comparing the operator distance with one or more threshold distances;
determining an operator direction with respect to the marine vessel based on the fob signal from the operator fob; and
controlling operation of one or more devices on the marine vessel based on the comparison, the operator direction, and the set of system commands for the fob identification.

11. The method of claim 10, wherein controlling operation of the one or more devices includes activating or deactivating at least one of a propulsion device, a door lock, a vessel light, an entertainment device, an environmental control system when the operator distance crosses one of the threshold distances.

12. The method of claim 11, further comprising determining an operator direction with respect to the marine vessel based on the fob signal from the operator fob, wherein the activation or deactivation of the one or more devices is further based on the operator direction.

13. The method of claim 10, wherein the operator distance is determined based on a radio signal strength indicator of the fob signal, and where the operator direction is determined based on a change in operator distance over time.

14. The method of claim 10, wherein the method further includes:
receiving fob signals from at least two fobs;
selecting one of the at least two fobs as the operator fob; and
accessing the set of system commands associated with the fob identification for the fob selected as the operator fob.

15. The method of claim 14, wherein the operator fob is selected from the at least two fobs based on a prioritized list of permitted fob identifications.

16. The method of claim 14, wherein the operator fob is selected based on an order of detection of the at least two fobs.

17. The method of claim 10, wherein each system command in the set of system commands for each fob identification is associated with one of a plurality of threshold distances, and further comprising generating a different command to control operation of the one or more devices on the marine vessel as the operator distance crosses each of the plurality of threshold distances from the marine vessel.

* * * * *